United States Patent
Cosimini et al.

(10) Patent No.: US 8,971,202 B2
(45) Date of Patent: Mar. 3, 2015

(54) CELLULAR RADIO NETWORK

(71) Applicant: Vodafone IP Licensing Limited, Newbury Berkshire (GB)

(72) Inventors: Peter Cosimini, Newbury (GB); Andrew Dunkin, Newbury (GB); Paul Edwards, Newbury (GB)

(73) Assignee: Vodafone IP Licensing Limited, Newbury Berkshire (GB)

( * ) Notice: Subject to any disclaimer, the term of this patent is extended or adjusted under 35 U.S.C. 154(b) by 0 days.

(21) Appl. No.: 13/761,903

(22) Filed: Feb. 7, 2013

(65) Prior Publication Data

US 2013/0201854 A1 Aug. 8, 2013

(30) Foreign Application Priority Data

Feb. 8, 2012 (EP) ..................................... 12154588

(51) Int. Cl.
H04W 4/00 (2009.01)
H04J 3/14 (2006.01)
H04W 24/02 (2009.01)
H04L 27/26 (2006.01)

(52) U.S. Cl.
CPC ........... H04W 24/02 (2013.01); H04L 27/2646 (2013.01)

USPC ............................ 370/252; 370/329; 370/341

(58) Field of Classification Search
None
See application file for complete search history.

(56) References Cited

U.S. PATENT DOCUMENTS

| | | | |
|---|---|---|---|
| 2004/0248527 A1* | 12/2004 | Park et al. ...................... | 455/118 |
| 2008/0260062 A1* | 10/2008 | Imamura ........................ | 375/267 |
| 2010/0027483 A1* | 2/2010 | Ofuji et al. .................... | 370/329 |
| 2010/0027691 A1* | 2/2010 | Kent .............................. | 375/260 |
| 2011/0211627 A1* | 9/2011 | Suzuki et al. ................. | 375/224 |
| 2011/0317745 A1* | 12/2011 | Okubo et al. ................. | 375/140 |

FOREIGN PATENT DOCUMENTS

| | | |
|---|---|---|
| EP | 2037601 | 3/2009 |
| EP | 2323435 | 5/2011 |
| EP | 2375800 | 10/2011 |

* cited by examiner

*Primary Examiner* — Chi H Pham
*Assistant Examiner* — Soon-Dong D Hyun
(74) *Attorney, Agent, or Firm* — Workman Nydegger

(57) ABSTRACT

To avoid reference symbol collision, between reference symbols used by neighboring cells in an OFDM based cellular telecommunications network, the transmission symbols on a given subcarrier used by respective neighboring base stations are compared and where both transmission symbols are determined to be reference symbols the start time of the frame timing period of one of the base stations is adjusted.

21 Claims, 4 Drawing Sheets

CELLULAR RADIO NETWORK

CROSS REFERENCE TO RELATED APPLICATIONS

This application claims priority to European Application Number 12154588.3, filed on Feb. 8, 2012, the entirety of which is incorporated herein by reference.

TECHNICAL FIELD OF THE INVENTION

The present invention concerns a method of operating a radio network comprising a plurality of base stations and at least one subscriber station, a network controller for such a radio network and a corresponding radio network.

BACKGROUND TO THE INVENTION

The Third Generation Partnership Project (3GPP) has developed standards for a cellular communications system, referred to as Long Term Evolution (LTE). LTE is based on transmission using Orthogonal Frequency Division Multiplexed (OFDM) signals.

An OFDM signal comprises a plurality of subcarriers, each of which is modulated to carry a transmission symbol. Data for transmission is divided into a plurality of parallel streams, one for each subcarrier. The transmission symbol for each subcarrier is generated by modulating the data using a conventional modulation scheme. Advantageously, OFDM simplifies channel equalisation, by adapting the modulation scheme applied to each subcarrier according to the narrowband propagation conditions for that subcarrier.

In cellular systems, such as LTE, a mobile station estimates the downlink radio channel in order to coherently demodulate information transmitted to it from the base station. In LTE, the base station inserts reference symbols (RS) into the OFDM signal that it transmits. These are used for channel estimation by the mobile stations. At least one cell-specific reference symbol is transmitted by a base station in a given time period.

3GPP standard TS 36.211 Release 9 defines the transmission of reference symbols in the downlink. The reference symbols are transmitted over the full downlink channel bandwidth for the cell covered by the base station. Mobile stations measure the reference symbols transmitted by the base station providing them with service. They additionally measure the reference symbols transmitted by other base stations. This is useful for handover purposes, when moving between cells covered by different base stations.

It is desirable that each mobile station receives the cell-specific reference symbols from each relevant base station, in order to ensure that it can properly receive data. Consequently, power allocation and interference management for the transmission of reference symbols is considered by existing standards. In particular, it is desirable to avoid reference symbols transmitted by two different base stations overlapping in both time and frequency. This is termed a reference symbol collision.

Since reference symbols are repeatedly transmitted by the base stations, independently from user data, reference symbol collision leads to constant interference. Any attempt to boost the power allocated to the base stations reference symbols will result in increased interference to other base stations reference symbols.

3GPP standard TS 36.211 Release 9 provides for frequency shifting of one base station reference symbol to avoid overlap. In other words, the subcarriers that are used to carry the reference symbols can be changed slightly. Nevertheless, only a limited number of frequency shifts are possible using such a technique. Moreover, such a technique requires advanced planning of resource allocation to reference between different base stations. Avoiding reference symbol collisions without these complications is a particular difficulty.

SUMMARY OF THE INVENTION

Against this background, there is provided a method of operating a radio network comprising a plurality of base stations and a plurality of subscriber stations, each base station being configured to transmit Orthogonal Frequency Division Multiplexed, OFDM, signals comprising a plurality of subcarriers, each subcarrier being modulated by transmission symbols, a predetermined number of transmission symbols defining a recurring frame timing period. The method comprises: determining that the respective transmission symbol of a first base station and a second base station on the same subcarrier and at the same time are both reference symbols; and adjusting the start time of the frame timing period for the first base station.

Adjusting the frame timing period is a significant improvement on existing approaches for dealing with reference symbol collision. It provides a greater range of possibilities for shifting the reference symbol timing between base stations. For some dense urban environments with small inter-site distances, 8 to 10 neighbouring cells are common. It can be shown that without any specific reference symbol planning, the probability of reference symbol overlap is not negligible: 14% on average in the case of two antennas; and 21% on the average in the case of four antennas.

The probability of reference symbol collisions can therefore be relatively high, particularly where reference symbol frequencies and timings are uncoordinated. Increasing the number of possible shifts in frequency and time reduces the likelihood of a reference symbol collision.

The determination of a reference symbol collision can be made in a number of different ways. In one embodiment, the step of determining comprises: establishing a link quality between a subscriber station and the first base station; establishing a received power level at the subscriber station from the second base station; determining that the respective transmission symbol of the first base station and the second base station on the same subcarrier and at the same time are both reference symbols on the basis of the link quality for the first base station and the received power level for the second base station.

Optionally, the step of determining further comprises: establishing a link quality between a subscriber station and the first base station; identifying one or more subcarriers and one or more time periods allocated by the first base station for transmissions specific to the subscriber station; identifying one or more subcarriers and one or more time periods allocated by the second base station for transmissions specific to the subscriber station; determining that the respective transmission symbol of the first base station and the second base station on the same subcarrier and at the same time are both reference symbols on the basis of the established link quality and the identified one or more subcarriers and one or more time periods for the first base station and for the second base station.

Preferably, the determination that the respective transmission symbol of the first base station and the second base station on the same subcarrier and at the same time are both reference symbols occurs when the identified one or more subcarriers and one or more time periods for the first base station and one or more subcarriers and one or more time periods for the second base station are different. If interference is received at a subscriber station from the transmissions of two different base stations, but the resource allocations by the base stations for the subscriber station are different, this may indicate reference symbol collision.

Advantageously, the step of establishing a link quality between the subscriber station and the first base station comprises measuring an error rate of data received by the subscriber station from the first base station.

In another embodiment, the step of determining comprises: estimating a data throughput from the first base station to a subscriber station on the basis of the location of the subscriber station; determining an actual data throughput from the first base station to the subscriber station; and determining that the respective transmission symbol of the first base station and the second base station on the same subcarrier and at the same time are both reference symbols on the basis of the estimated data throughput and the determined actual data throughput. A significantly lower throughput than the estimated throughput may result from incomplete or inaccurate channel estimation, due to reference symbol collision.

In a further embodiment, the step of determining comprises: establishing a time difference between reception of a predetermined symbol from the first base station and reception of a predetermined symbol from the second base station. Optionally, the predetermined symbol from the first base station and the predetermined symbol from the second base station comprise one of: a reference symbol; a primary synchronisation signal; a secondary synchronisation signal. Advantageously, the step of determining further comprises identifying that the established time difference is no greater than the duration of transmission for one transmission symbol.

Optionally, the first base station transmits reference symbols on a plurality of antennas. Then, the step of determining that the respective transmission symbol of the first base station and the second base station on the same subcarrier and at the same time are both reference symbols may comprise determining that the transmission symbol of the first base station for any of the plurality of antennas and the transmission symbol of the second base station, on the same subcarrier and at the same time, are both reference symbols.

The present invention may also reside in a computer readable medium having a computer program operable to carry of the method as herein described recorded thereon.

In another aspect, the present invention may be found in a network controller for a radio network comprising a plurality of base stations and a plurality of subscriber stations, comprising: a transmission controller, arranged to configure a transmitter of a first base station and a transmitter of a second base station to transmit Orthogonal Frequency Division Multiplexed, OFDM, signals comprising a plurality of subcarriers, each subcarrier being modulated by transmission symbols, a predetermined number of transmission symbols defining a recurring frame timing period; and a processor, configured to determine that the respective transmission symbol of a first base station and a second base station on the same subcarrier and at the same time are both reference symbols. The transmission controller is further adapted to adjust the start time of the frame timing period for the first base station.

In one embodiment, the processor is further arranged to establish a link quality between a subscriber station and the first base station, to establish a received power level at the subscriber station from the second base station, and to determine that the respective transmission symbol of the first base station and the second base station on the same subcarrier and at the same time are both reference symbols on the basis of the link quality for the first base station and the received power level for the second base station.

Optionally, the processor is arranged to establish a link quality between a subscriber station and the first base station, to identify one or more subcarriers and one or more time periods allocated by the first base station for transmissions specific to the subscriber station, to identify one or more subcarriers and one or more time periods allocated by the second base station for transmissions specific to the subscriber station and to determine that the respective transmission symbol of the first base station and the second base station on the same subcarrier and at the same time are both reference symbols on the basis of the established link quality and the identified one or more subcarriers and one or more time periods for the first base station and for the second base station.

Advantageously, the processor is further arranged to determine that the respective transmission symbol of the first base station and the second base station on the same subcarrier and at the same time are both reference symbols by identifying that one or more subcarriers and one or more time periods for the first base station and one or more subcarriers and one or more time periods for the second base station are different.

Optionally, the processor is arranged to establish the link quality between the subscriber station and the first base station by measuring an error rate of data received by the subscriber station from the first base station.

In another embodiment, the processor is arranged to determine that the respective transmission symbol of the first base station and the second base station on the same subcarrier and at the same time are both reference symbols by estimating a data throughput from the first base station to a subscriber station on the basis of the location of the subscriber station, determining an actual data throughput from the first base station to the subscriber station and determining that the respective transmission symbol of the first base station and the second base station on the same subcarrier and at the same time are both reference symbols on the basis of the estimated data throughput and the determined actual data throughput.

In a further embodiment, the processor is arranged to determine that the respective transmission symbol of the first base station and the second base station on the same subcarrier and at the same time are both reference symbols by establishing a time difference between reception of a predetermined symbol from the first base station and reception of a predetermined symbol from the second base station. Optionally, the predetermined symbol from the first base station and the predetermined symbol from the second base station comprise one of: a reference symbol; a primary synchronisation signal; a secondary synchronisation signal. Advantageously, the processor is arranged to determine that the respective transmission symbol of the first base station and the second base station on the same subcarrier and at the same time are both reference symbols by identifying that the established time difference is no greater than the duration of transmission for one transmission symbol.

In some embodiments, at least a part of the processor is a located at a subscriber station. Optionally, at least a part of the processor is located at a base station. Data can be passed between the subscriber station and the base station using the radio link.

The present invention may also be embodied by a radio network, comprising: a first base station, configured for communication with at least one subscriber station; a second base station, configured for communication with at least one subscriber station; and a network controller, as herein described.

Alternatively, the present invention may be found in a radio network, comprising: a subscriber station, configured for communication with at least one base station; a first base station, configured for communication with the subscriber station; a second base station, configured for communication with the subscriber station; and a network controller, as herein described.

Optionally, the first base station is arranged to transmit reference symbols on a plurality of antennas. Then, the processor may be configured to determine that the transmission symbol of the first base station for any of the plurality of antennas and the transmission symbol of the second base station, on the same subcarrier and at the same time, are both reference symbols. Additionally or alternatively, the second base station transmits reference symbols on a plurality of antennas. Then, the processor may be configured to determine that the transmission symbol of the first base station and the transmission symbol of the second base station for any of the plurality of antennas, on the same subcarrier and at the same time, are both reference symbols.

BRIEF DESCRIPTION OF THE DRAWINGS

The invention may be put into practice in various ways, a number of which will now be described by way of example only and with reference to the accompanying drawings in which.

DETAILED DESCRIPTION OF A PREFERRED EMBODIMENT

For the purposes of this description, the terms mobile station and base station have been used. The term mobile station is equivalent to the term User Equipment (UE) employed in 3GPP standards or the term subscriber station. The term base station can be considered equivalent to the term eNodeB or cell used in 3GPP standards, although it is recognised that the eNodeB and cell are separate devices in the LTE system.

Figure 1:
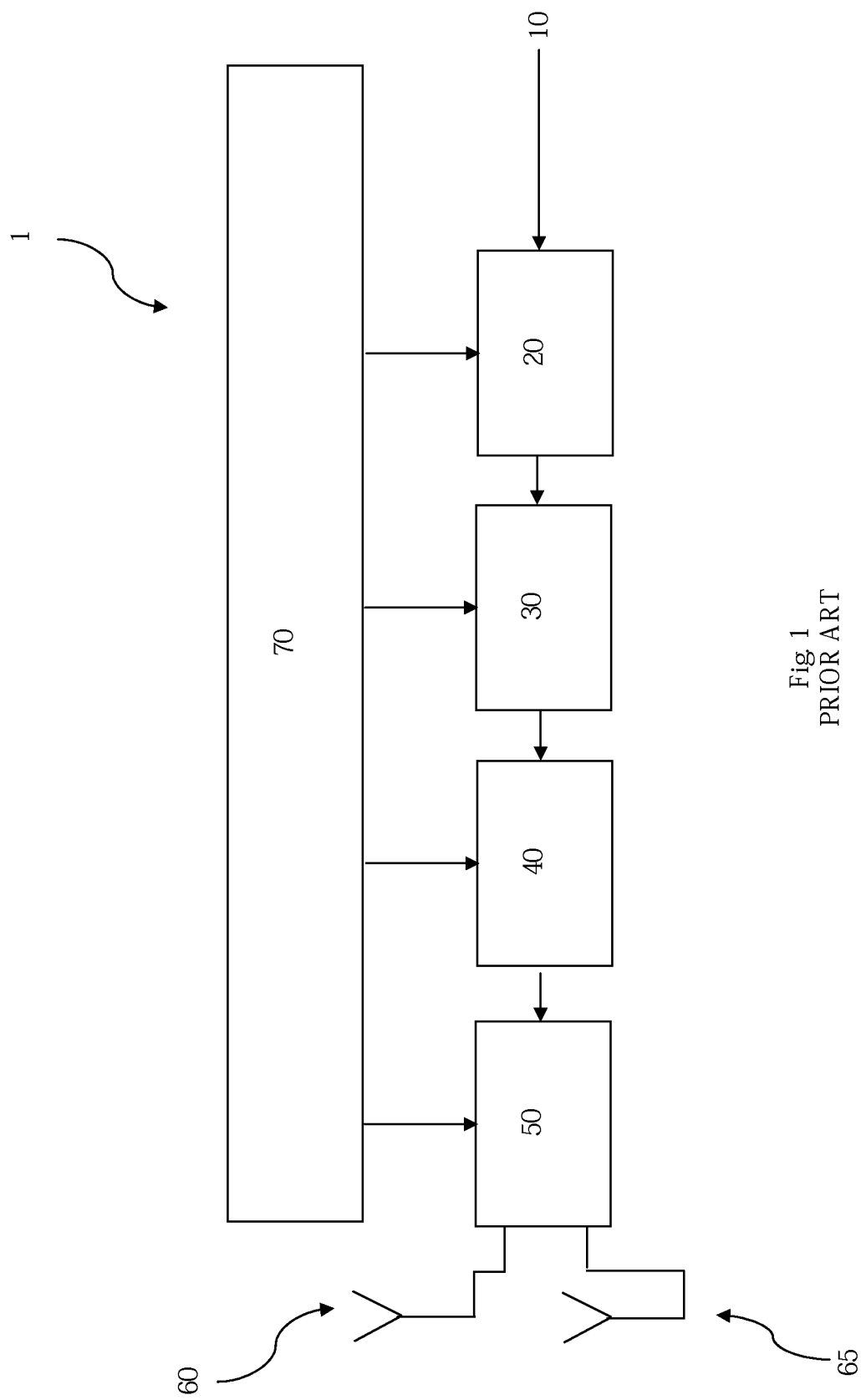
FIG. 1 shows an exemplary base station for an LTE system according to the prior art, but suitable for use with the present invention.

Referring first to FIG. 1, there is shown an example of a base station according to the prior art, for use with the present invention. This is based on the description and drawings shown in 3GPP standard TS 36.302 Release 9 in section 6.2. The base station 1 comprises: a data input 10; a coding block 20; a data modulation block 30; a resource mapping block 40; an antenna mapping block 50; a first transmission antenna 60; a second transmission antenna 65; and a media access control (MAC) scheduler 70.

Data for transmission arrives at data input 10 and is divided into transport blocks. Channel coding is then applied to each of the transport blocks by coding block 20. This provides redundancy to improve error correction. The coded data is then modulated by data modulation block 30 to generate a plurality of transmission symbols. The transmission symbols are mapped for transmission by specific subcarriers at specific times in resource mapping block 40. This block also handles power allocation. The allocated resources are then passed to antenna mapping block 50, which allocates transmission of resources between multiple antennas, specifically first antenna 60 and second antenna 65.

The MAC scheduler 70 receives channel state information and controls the modulation schemes applied by data modulation block 30, the allocation of transmission symbols to subcarriers, timing and power by resource mapping block 40 and the allocation of resources to antennas by antenna mapping block 50. The MAC Scheduler 70 is embodied in software operating on a processor, although it may alternatively comprise a dedicated processor.

Figure 2:
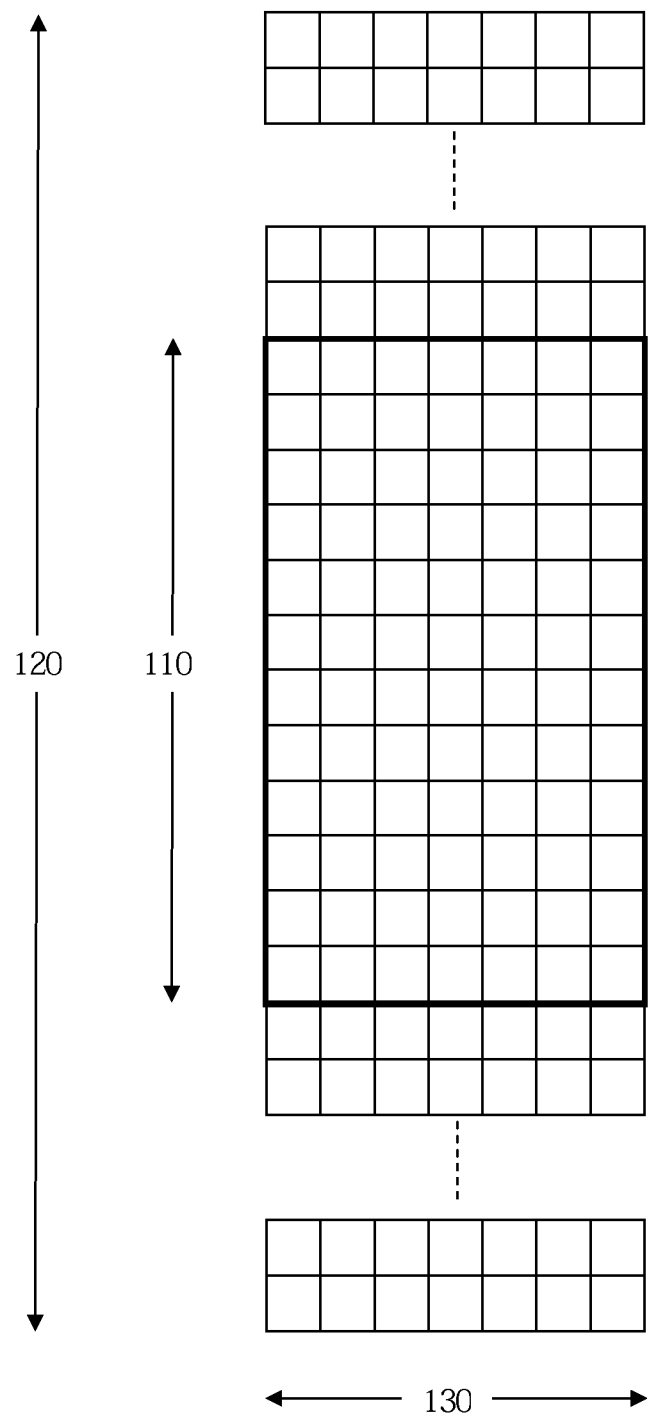
FIG. 2 illustrates allocation of resources for transmission by the base station of FIG. 1 according to the prior art.

Referring next to FIG. 2 there is shown an illustration of the resource allocation for transmission of OFDM signals by the bass station on FIG. 1. This illustration is based on the drawing shown in 3GPP technical standard TS 36.211 Release 9 in section 6.2.

The OFDM signal is divided into subcarriers, which are sped across the bandwidth of the signal with a fixed frequency spacing between each subcarrier. The subcarriers are illustrated schematically along the vertical access in FIG. 2 and a resource block comprises a plurality of subcarriers. The resource block bandwidth 110 shows the number of subcarriers in a resource block. The OFDM transmission comprises at least one resource block and typically comprises multiple resource blocks. Bandwidth 120 represents the total number of subcarriers transmitted in the OFDM signal.

In a time slot, each sub carrier carries a plurality of transmission symbols. Each transmission symbol comprises modulated data, using a modulation scheme such as Binary Phase-Shift Keying (BPSK) or Quadrature Amplitude Modulation (QAM). The time slot length 130 depicts the number of transmission symbols in a time slot. A frame is 20 time slots in duration and the start and end times of a frame are defined by means of synchronisation signals.

Reference symbols are allocated for transmission in a specific transmission symbol by specific subcarriers. Where the base station transmits from more than one antenna, reference symbols are transmitted on each of the antennas. However, the reference symbols for one antenna are transmitted at different times and on different subcarriers in comparison with the reference symbols for other antennas. This enables the mobile stations to estimate and measure the channel from each antenna.

Figure 3:
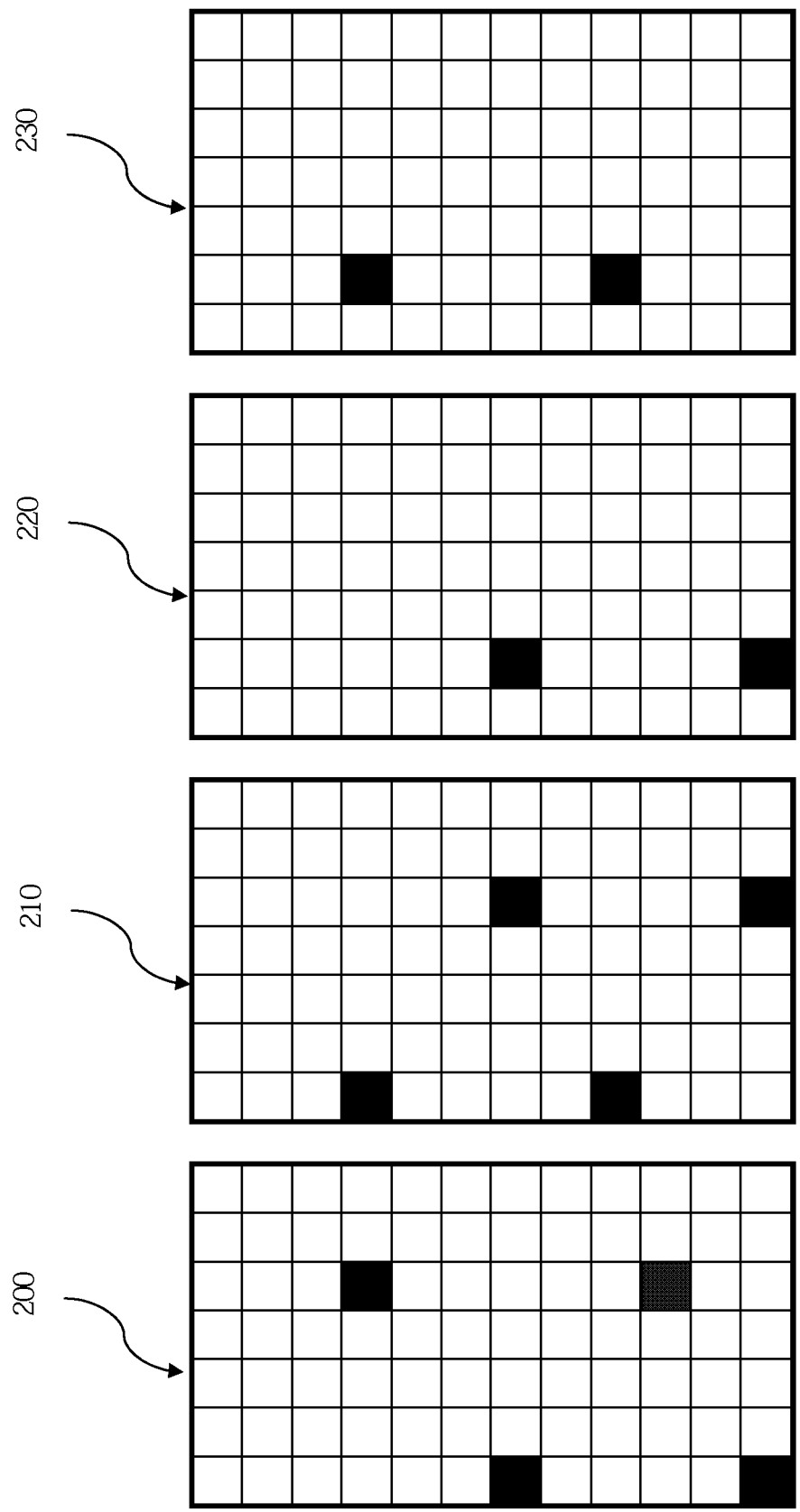
FIG. 3 schematically shows the allocation of resources for reference symbol transmission between multiple antennas according to the prior art.

Referring now to FIG. 3, there is shown an illustration of the allocation of reference symbols for transmission in the downlink using multiple antennas. This illustration is based upon the drawings shown in 3GPP standard TS36.211 Release 9 under section 6.10. A first resource block 200 is allocated for transmission by a first antenna. A second resource block 210 is allocated for transmission by a second antenna. A third resource block 220 is allocated to a transmission by a third antenna, where a third antenna is used. A fourth resource block 230 is allocated for transmission by a fourth antenna, where a fourth antenna is used. The shaded transmission symbols illustrate the allocation of subcarriers and transmission symbol timings for reference symbols in respect of each antenna. It will be noted that the transmission symbol used for a reference symbol in respect of one antenna is not used for transmission of a reference symbol in respect of any other antenna.

Figure 4:
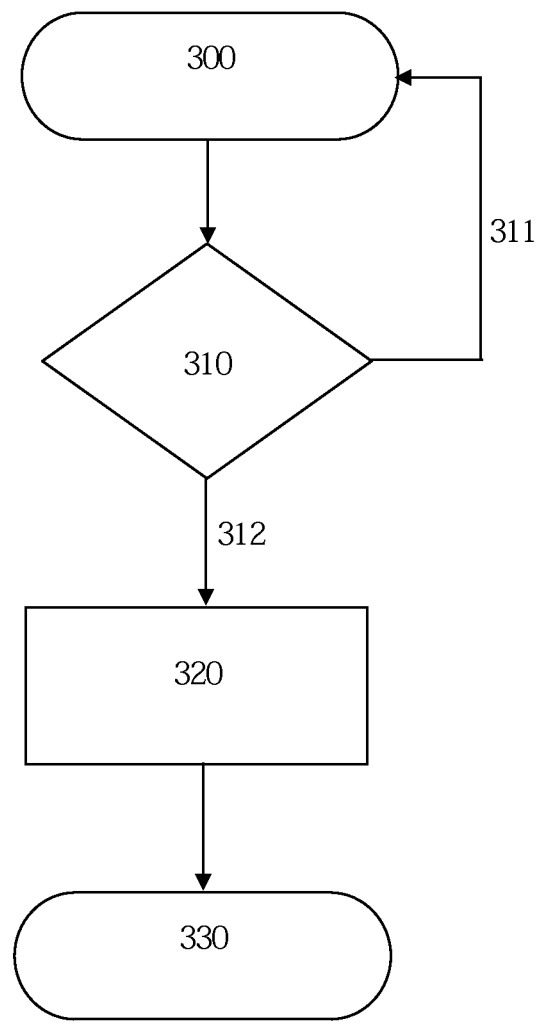
FIG. 4 shows a flowchart for an example of the implementation of the present invention.

Referring now to FIG. 4, there is shown a flowchart of a method according to the present invention. In a first step 300 of the flowchart, the process is started. In a second step 310, it is determined whether the respective transmission symbol of a first base station and a second base station on the same subcarrier and at the same time are both reference symbols. If this is not the case, path 311 is followed and the process is restarted.

Otherwise, path 312 is followed and the process continues to third step 320. In this step, the start time of the frame timing period for the base station is adjusted. This is effected by MAC scheduler 70. The process then terminates in fourth step 330.

Changing the relative frame timing offset between cells can avoid reference symbol overlap. The synchronisation information transmitted by the base station is adjusted accordingly, so that the mobile stations can continue to receive transmissions. The relative frame timing offset can be adjusted by the duration of one transmission symbol or by a multiple of the duration of a transmission symbol.

A number of different methods for determining that reference symbol collisions have occurred are now described.

In a first approach, the mobile station monitors data reception quality in the downlink and reports this to its serving base station. This reporting is made over the uplink. When the mobile station reports poor data reception quality, for example a high reported block error rate, this may indicate reference symbol collision, but it may also suggest interference from user-specific data transmissions.

A check is then made to determine whether the corresponding co-channel resources in neighbouring cells, that is subcarrier and symbol timing, are not both used. If this is the case, this is considered indicative of failure in the channel estimation procedure due to reference symbol collisions. This is carried out in the base station.

The 3GPP LTE standards support the exchange of base station load, in other words power and resource block usage between base stations, so no additional signalling is required. As explained above, a first aspect of this method is distinguishing between cases where the high data error rate is due to poor coverage, that is poor wanted signal level, or reference symbol collisions.

A second aspect of the method is identifying the neighbouring base station or base stations responsible for the collision. This is achieved by using reports regarding at least one neighbouring base station from the mobile station, measuring the signal level of neighbouring base stations. Neighbouring base stations are those having proximate geographical coverage areas to the base station serving the mobile station. If the reported received signal quality is poor and the mobile station reports high received signal power level from one or more neighbouring base stations, which are not using co-channel resources, then there is high likelihood this is due to reference symbol collisions. Then, the base station time-shifts its frame structure by one symbol to avoid further reference symbol overlap.

This general approach can also be implemented without the need for a mobile station to report signal quality levels. The base station can also use measured uplink signal levels to determine an approximate average throughput for the particular mobile station location. Additionally or alternatively, it can use a corresponding propagation path loss estimation as part of this determination. Any significant deviation between the estimated and actual throughput would also indicate potential problems in channel estimation due to reference symbol overlap.

In a second approach, the base station can use a Reference Symbol Received Quality (RSRQ) measurement in order to determine that there is a reference symbol collision. In 3GPP technical standard TS 36.302 Release 9, RSRQ is defined as the ratio N×RSRP/(E-UTRA carrier RSSI).

Reference Symbol Received Power (RSRP) is the average over the power contributions (in Watts) of the received transmission symbols that carry cell-specific reference signals within the considered measurement frequency bandwidth. E-UTRA Carrier Received Signal Strength Indicator (RSSI), comprises the linear average of the total received power (in Watts) for reference symbols for a first antenna port over N number of resource blocks by the mobile station from all sources, including co-channel serving and non-serving base stations, adjacent channel interference, thermal noise etc. The measurements in the numerator and denominator are made over the same set of resource blocks.

Where the RSRQ reported by the mobile station is low, this may indicate reference symbol collision.

A third approach to determining reference symbol collisions is as follows. A mobile station can measure the time difference between reference symbols received from its own serving cell and other neighbouring cells and report this to the base station. If the time difference is within one symbol, this indicates some level of reference symbol overlap. Then, the eNodeB can adjust its frame timing accordingly to remove any overlap. It is noted that Release 9 3GPP standards do not define measurement and reporting of reference symbol time difference by a mobile station.

An alternative technique for estimating the relative difference in frame timing between base stations in an unsynchronised network is to use the Primary Synchronisation Signal (PSS) and Secondary Synchronisation Signal (SSS). These are broadcast by every LTE base station to enable mobile stations to time synchronise (and frequency synchronise) to a cell. Using these signals it is possible for a mobile station to estimate the relative difference in frame timing between different base stations and report this difference to the base station. It is again noted that Release 9 3GPP standards do not define this reporting. Again in this case, if the time difference is within one symbol indicating some level of reference symbol overlap the eNodeB can adjust its frame timing accordingly to remove any overlap.

The skilled person will be aware that various modifications to the above identified embodiment can be made. For example, the base station can use only one antenna, or use more than two antennas. Also, the base station may be designed differently, whilst still delivering the same transmission signals. Where the base station uses only one antenna, antenna mapping block 50 may not be necessary.

Although the invention is described with reference to an LTE system, it will be understood that it is applicable to other radio-based systems, such as IEEE 802.16 (WiMax).

The invention claimed is:

1. A method of operating a radio network comprising a plurality of base stations and a plurality of subscriber stations, each base station being configured to transmit Orthogonal Frequency Division Multiplexed, OFDM, signals comprising a plurality of subcarriers, each subcarrier being modulated by transmission symbols, a predetermined number of transmission symbols defining a recurring frame timing period, the method comprising:

determining that respective transmission symbols of a first base station and a second base station on the same subcarrier and at the same time are both reference symbols, comprising:

establishing a link quality between a subscriber station and the first base station;

establishing a received power level at the subscriber station from the second base station; and determining that the respective transmission symbols of the first base station and the second base station on the same subcarrier and at the same time are both reference symbols on the basis of the link quality corresponding to the first base station and the received power level corresponding to the second base station; and adjusting a start time of a frame timing period for the first base station.

2. The method of claim 1, wherein the step of determining comprises:
identifying one or more subcarriers and one or more time periods allocated by the first base station for transmissions specific to the subscriber station;
identifying one or more subcarriers and one or more time periods allocated by the second base station for transmissions specific to the subscriber station;
determining that the respective transmission symbol of the first base station and the second base station on the same subcarrier and at the same time are both reference symbols on the basis of the established link quality and the identified one or more subcarriers and one or more time periods for the first base station and for the second base station.

3. The method of claim 2, wherein the determination that the respective transmission symbol of the first base station and the second base station on the same subcarrier and at the same time are both reference symbols occurs when the identified one or more subcarriers and one or more time periods for the first base station and one or more subcarriers and one or more time periods for the second base station are different.

4. The method of claim 1, wherein the step of establishing a link quality between the subscriber station and the first base station comprises measuring an error rate of data received by the subscriber station from the first base station.

5. The method of claim 1, wherein the step of determining comprises:
estimating a data throughput from the first base station to a subscriber station on the basis of the location of the subscriber station;
determining an actual data throughput from the first base station to the subscriber station; and
determining that the respective transmission symbol of the first base station and the second base station on the same subcarrier and at the same time are both reference symbols on the basis of the estimated data throughput and the determined actual data throughput.

6. The method of claim 1, wherein the step of determining comprises:
establishing a time difference between reception of a predetermined symbol from the first base station and reception of a predetermined symbol from the second base station.

7. The method of claim 6, wherein the predetermined symbol from the first base station and the predetermined symbol from the second base station comprise one of: a reference symbol; a primary synchronisation signal; a secondary synchronisation signal.

8. The method of claim 6, wherein the step of determining further comprises identifying that the established time difference is no greater than the duration of transmission for one transmission symbol.

9. The method of claim 1, wherein the first base station transmits reference symbols on a plurality of antennas and wherein the step of determining that the respective transmission symbol of the first base station and the second base station on the same subcarrier and at the same time are both reference symbols, comprises determining that the transmission symbol of the first base station for any of the plurality of antennas and the transmission symbol of the second base station, on the same subcarrier and at the same time, are both reference symbols.

10. A non-transitory computer readable medium having computer executable instructions recorded thereon that, when executed by a processor, are operable to carry out the method of claim 1.

11. A network controller for a radio network comprising a plurality of base stations and a plurality of subscriber stations, comprising:
a transmission controller, arranged to configure a transmitter of a first base station and a transmitter of a second base station to transmit Orthogonal Frequency Division Multiplexed, OFDM, signals comprising a plurality of subcarriers, each subcarrier being modulated by transmission symbols, a predetermined number of transmission symbols defining a recurring frame timing period; and
a processor, configured to determine that respective transmission symbols of a first base station and a second base station on the same subcarrier and at the same time are both reference symbols, the processor being arranged to:
establish a link quality between a subscriber station and the first base station;
establish a received power level at the subscriber station from the second base station; and
determine that the respective transmission symbols of the first base station and the second base station on the same subcarrier and at the same time are both reference symbols on the basis of the link quality corresponding to the first base station and the received power level corresponding to the second base station; and
wherein the transmission controller is further adapted to adjust a start time of a frame timing period for the first base station.

12. The network controller of claim 11, wherein the processor is arranged to:
identify one or more subcarriers and one or more time periods allocated by the first base station for transmissions specific to the subscriber station,
identify one or more subcarriers and one or more time periods allocated by the second base station for transmissions specific to the subscriber station, and
determine that the respective transmission symbol of the first base station and the second base station on the same subcarrier and at the same time are both reference symbols on the basis of the established link quality and the identified one or more subcarriers and one or more time periods for the first base station and for the second base station.

13. The network controller of claim 12, wherein the processor is further arranged to determine that the respective transmission symbol of the first base station and the second base station on the same subcarrier and at the same time are both reference symbols by identifying that one or more subcarriers and one or more time periods for the first base station and one or more subcarriers and one or more time periods for the second base station are different.

14. The network controller of claim 11, wherein the processor is arranged to establish the link quality between the subscriber station and the first base station by measuring an error rate of data received by the subscriber station from the first base station.

15. The network controller of claim 11, wherein the processor is arranged to determine that the respective transmission symbol of the first base station and the second base station on the same subcarrier and at the same time are both reference symbols by estimating a data throughput from the first base station to a subscriber station on the basis of the location of the subscriber station, determining an actual data throughput from the first base station to the subscriber station and determining that the respective transmission symbol of the first base station and the second base station on the same subcarrier and at the same time are both reference symbols on the basis of the estimated data throughput and the determined actual data throughput.

16. The network controller of claim 11, wherein the processor is arranged to determine that the respective transmission symbol of the first base station and the second base station on the same subcarrier and at the same time are both reference symbols by establishing a time difference between reception of a predetermined symbol from the first base station and reception of a predetermined symbol from the second base station.

17. The network controller of claim 16, wherein the predetermined symbol from the first base station and the predetermined symbol from the second base station comprise one of: a reference symbol; a primary synchronisation signal; a secondary synchronisation signal.

18. The network controller of claim 16, wherein the processor is arranged to determine that the respective transmission symbol of the first base station and the second base station on the same subcarrier and at the same time are both reference symbols by identifying that the established time difference is no greater than the duration of transmission for one transmission symbol.

19. The network controller of claim 11, wherein the processor is located at a subscriber station.

20. A radio network, comprising:
  a subscriber station, configured for communication with at least one base station;
  a first base station, configured for communication with the subscriber station;
  a second base station, configured for communication with the subscriber station; and
  a network controller, according to claim 19.

21. A radio network, comprising:
  a first base station, configured for communication with at least one subscriber station;
  a second base station, configured for communication with at least one subscriber station; and
  a network controller, according to claim 11.

* * * * *